(12) United States Patent
Godbout et al.

(10) Patent No.: US 12,453,798 B2
(45) Date of Patent: Oct. 28, 2025

(54) UV-LIGHT AIR PURIFYING APPARATUS

(71) Applicant: EFFECTIV HVAC INC., Saint-Laurent (CA)

(72) Inventors: Francois Godbout, Montreal (CA); Vishalkumar Patel, Montreal (CA)

(73) Assignee: EFFECTIV HVAC INC., Saint-Laurent (CA)

( * ) Notice: Subject to any disclaimer, the term of this patent is extended or adjusted under 35 U.S.C. 154(b) by 1009 days.

(21) Appl. No.: 17/535,072

(22) Filed: Nov. 24, 2021

(65) Prior Publication Data
US 2023/0158197 A1     May 25, 2023

(51) Int. Cl.
*B01D 53/02*     (2006.01)
*A61L 9/20*     (2006.01)
*B01D 46/00*     (2022.01)

(52) U.S. Cl.
CPC ............ *A61L 9/20* (2013.01); *B01D 46/0028* (2013.01); *A61L 2209/12* (2013.01); *A61L 2209/14* (2013.01); *B01D 2279/65* (2013.01)

(58) Field of Classification Search
CPC .... A61L 2209/12; A61L 2209/14; A61L 9/20; B01D 2279/65; B01D 46/0028; B01D 46/0043; B01D 46/0047; B01D 46/10; B01D 46/521
See application file for complete search history.

(56) References Cited

U.S. PATENT DOCUMENTS

| | | | | |
|---|---|---|---|---|
| 5,997,619 A * | 12/1999 | Knuth | ................ | B01D 46/0038 55/385.2 |
| 6,053,968 A * | 4/2000 | Miller | ................ | F24F 8/22 96/16 |
| 7,658,891 B1 * | 2/2010 | Barnes | ................ | C01B 13/11 128/205.28 |
| 2002/0170816 A1 * | 11/2002 | Leffler | ................ | C02F 1/74 204/157.5 |
| 2005/0000365 A1 * | 1/2005 | Nelsen | ................ | F24F 8/80 96/224 |
| 2008/0141864 A1 * | 6/2008 | McCarthy | ................ | B01D 46/24 96/224 |
| 2009/0294688 A1 * | 12/2009 | Evans | ................ | A61L 2/10 250/436 |

(Continued)

*Primary Examiner* — Christopher P Jones
(74) *Attorney, Agent, or Firm* — Jacob M. Ward; Ward Law Office LLC

(57) ABSTRACT

The air purifying apparatus comprises a purifying chamber comprising a peripheral wall that has an air inlet and an air outlet. A UV light source is located within an irradiation portion of the purifying chamber. An air channel extends between the air inlet and the air outlet for allowing the air to flow therein. A main baffle plate is fixed within the purifying chamber downstream of the air inlet and upstream of the air outlet such that the air channel will be formed about the main baffle plate, the main baffle plate comprising a UV-reflective surface in register with the UV light source and that is tangentially oriented at least partly upstream to reflect at least part of the UV light emitted by the UV light source upstream in the air channel. Also, the air channel has a wider cross-sectional area at its irradiation portion than at the air inlet, for decreasing the speed of the air flowing through the air channel which increases the time during which air particles will be exposed to the UV light source.

20 Claims, 5 Drawing Sheets

(56) References Cited

U.S. PATENT DOCUMENTS

| | | | | |
|---|---|---|---|---|
| 2013/0248734 A1* | 9/2013 | Berry | ............................ | A61L 9/18 250/435 |
| 2023/0144273 A1* | 5/2023 | Hosking | ....................... | A61L 9/20 422/121 |

* cited by examiner

UV-LIGHT AIR PURIFYING APPARATUS

FIELD OF THE INVENTION

The present invention relates to an air purifying apparatus, and more particularly to an air purifying apparatus such as a plenum equipped with a diffuser for distributing air into a destination area, that purifies the air of micro-organisms by means of UV light.

BACKGROUND OF THE INVENTION

In commercial or industrial buildings, a ventilation system conveys air into the different rooms through air ducts, by means of usual components such as air pumps or fans to provide positive pressure to push the air towards the rooms, heating and cooling systems, macro-particulate air filtration, air recuperation systems and air ducts that carry the air to and from the rooms.

It is known to install plenums in the room ceilings, which are connected to the air ducts, to supply the air through a diffuser panel (also called the diffuser face) of the plenum. The diffuser panel is provided with air outlets that comprise openings that are disposed and configured to allow the air to be injected into the room along a determined direction. Some plenums are also equipped with a particulate air filter for filtering macro-particulate air-borne particles. The size and type of particles that will be filtered depend on the type of filter being used.

However, conventional particulate air filters in air plenums do not allow purification or sterilization of the air from micro-organisms such as viruses, including for example the SARS-CoV-2 that causes the COVID-19 disease.

One method of sterilizing the air from micro-organisms comprises using ultraviolet germicidal irradiation (UVGI), e.g. by forcing air through UV lamps. Known air purification UVGI systems include e.g. freestanding units with shielded UV lamps that use a fan to force air past the UV light.

Ultraviolet (UV) light is a form of electromagnetic radiation with wavelength shorter than that of visible light, but longer than X-rays. UV light is consequently invisible to the human eye. UV radiation is present in sunlight, but it is also produced by electric arcs and specialized lights, such as mercury-vapor lamps, tanning lamps, and black lights. The chemical and biological effects of UV are greater than simple heating effects, and many practical applications of UV radiation derive from its interactions with organic molecules. Ultraviolet light of the "C" type, also called UV-C, is notably known for its germicidal effects.

However, UV light adversely affects humans: excessive exposure to UV radiation can result in acute and chronic harmful effects on the eye's dioptric system and retina, and exposure to UV radiation may cause some forms of skin cancer. UV-C notably is the highest-energy, most-dangerous type of ultraviolet radiation, and causes adverse effects that can variously be mutagenic or carcinogenic.

Consequently, using UV lights to purify the air by adding them to plenums that have air outlets that open into the room, has not been used yet, for the reason that the regulated safety standards that relate to the use of UV lights for purifying the air, would not be met by simply adding a UV light source to a conventional air plenum. Indeed, the concentration of UV light at the air outlet of the plenum, then remains too high for meeting the regulated safety standards.

SUMMARY OF THE INVENTION

The present invention relates to an air purifying apparatus for purifying air, comprising:

a purifying chamber comprising a peripheral wall that has an air inlet for receiving air into said purifying chamber from an air source and an air outlet for supplying air from said purifying chamber to an air destination area;

a UV light source located within an irradiation portion of said purifying chamber, for emitting air purifying UV light therein;

an air channel extending between said air inlet and said air outlet for allowing the air to flow therein from an upstream end at said air inlet towards a downstream end at said air outlet and to be purified by the UV light between said upstream and downstream ends; and a main baffle plate fixed within said purifying chamber downstream of said air inlet and upstream of said air outlet such that said air channel will be formed about said main baffle plate, said main baffle plate comprising a UV-reflective surface in register with said UV light source and that is tangentially oriented at least partly upstream to reflect at least part of the UV light emitted by said UV light source upstream in said air channel.

In one embodiment, said main baffle plate reflective surface comprises at least two segments with different angulations relative to said air channel, said at least two segments comprising an upstream segment located at an upstream extremity of said main baffle plate reflective surface and a downstream segment located at a downstream extremity of said main baffle plate reflective surface, with said downstream segment being more tangentially oriented upstream than said upstream segment.

In one embodiment, said at least two segments further comprise an intermediate segment located intermediate said upstream and downstream segments, with the intermediate segment being less tangentially oriented upstream than said upstream and downstream segments.

In one embodiment, the air purifying apparatus further comprises at least one secondary baffle plate within said purifying chamber located in said air channel downstream of said main baffle plate reflective surface, said at least one secondary baffle plate comprising a UV-absorbing surface, said at least one secondary baffle plate tangentially oriented at least partly upstream for blocking and absorbing at least part of the UV light emitted by said UV light source before it reaches said air outlet.

In one embodiment, said at least one secondary baffle plate is located on an opposite side of said main baffle plate relative to said main baffle plate reflective surface.

In one embodiment, said at least one secondary baffle plate comprises three secondary baffle plates disposed adjacent to said air outlet.

In one embodiment, the air purifying apparatus further comprises an auxiliary baffle plate within said purifying chamber located in said air channel between said main baffle plate reflective surface and said secondary baffle plates, said auxiliary baffle plate comprising a UV-reflective surface that is tangentially oriented at least partly upstream to reflect at least part of the UV light emitted by said UV light source upstream in said air channel, said auxiliary baffle plate positioned such that straight lines cannot be traced from said UV light source to said air outlet with less than three reflections within said purifying chamber to increase the absorption of said UV light therein.

In one embodiment, said purifying chamber peripheral wall is made of UV-reflective material.

In one embodiment, the air purifying apparatus further comprises a UV-absorbing panel provided on said peripheral wall downstream of said main baffle plate.

In one embodiment, said UV light source is a generally U-shaped UV-emitting light tube attached to said peripheral wall.

In one embodiment, said UV light source further emits visible light that is in the humanly perceptible visible spectrum, said visible light being less absorbed within said purifying chamber than said UV light such that at least some of said visible light will emanate out through said air outlet.

The present invention also relates to an air purifying apparatus for purifying air, comprising:

a purifying chamber comprising a peripheral wall that has an air inlet for receiving air into said purifying chamber from an air source and an air outlet for providing air from said purifying chamber to an air destination;

a UV light source located within an irradiation portion of said purifying chamber, for emitting air-purifying UV light therein;

an air channel extending between said air inlet and said air outlet for allowing the air to flow from an upstream end at said air inlet towards a downstream end at said air outlet and to be purified by the UV light between said upstream and downstream ends; and the air channel having a wider cross-sectional area at said irradiation portion of said purifying chamber than at said air inlet, for decreasing the speed of the air flowing through said air channel from said air inlet into said irradiation portion of said purifying chamber and for increasing the time during which air particles will be exposed to the UV light source within said irradiation portion of said purifying chamber.

In one embodiment, said purifying chamber comprises a plenum and a diverging collar upstream of said plenum, said diverging collar having a first end at said upstream end of said purifying chamber and a second end downstream of said first end, said diverging collar having a wider cross-sectional area at said second end than at said first end.

In one embodiment, the air purifying apparatus further comprises a main baffle plate fixed within said purifying chamber downstream of said air inlet and upstream of said air outlet, said main baffle plate comprising an air deflection surface that is tangentially oriented at least partly upstream, said main baffle plate deflection surface creating a first deviation of said air channel, said main baffle plate further decreasing the cross-sectional area of said air channel in said irradiation portion downstream of said irradiation portion.

In one embodiment, the air purifying apparatus further comprises an auxiliary baffle plate within said purifying chamber located in said air channel between said main baffle plate deflection surface and said secondary baffle plates, said auxiliary baffle plate being inclined at least partly upstream such that a portion of the air circulating in said air channel will be at least partly deviated toward an area located between some secondary baffle plates where it would otherwise circulate at a lesser debit rate.

In one embodiment, said air outlet is provided with a particulate air filter for filtering macro-particulate air-borne particles being conveyed through said air outlet, said particulate air filter further creating an air debit rate restriction upstream of said air outlet.

DETAILED DESCRIPTION OF THE EMBODIMENTS

Figure 1:
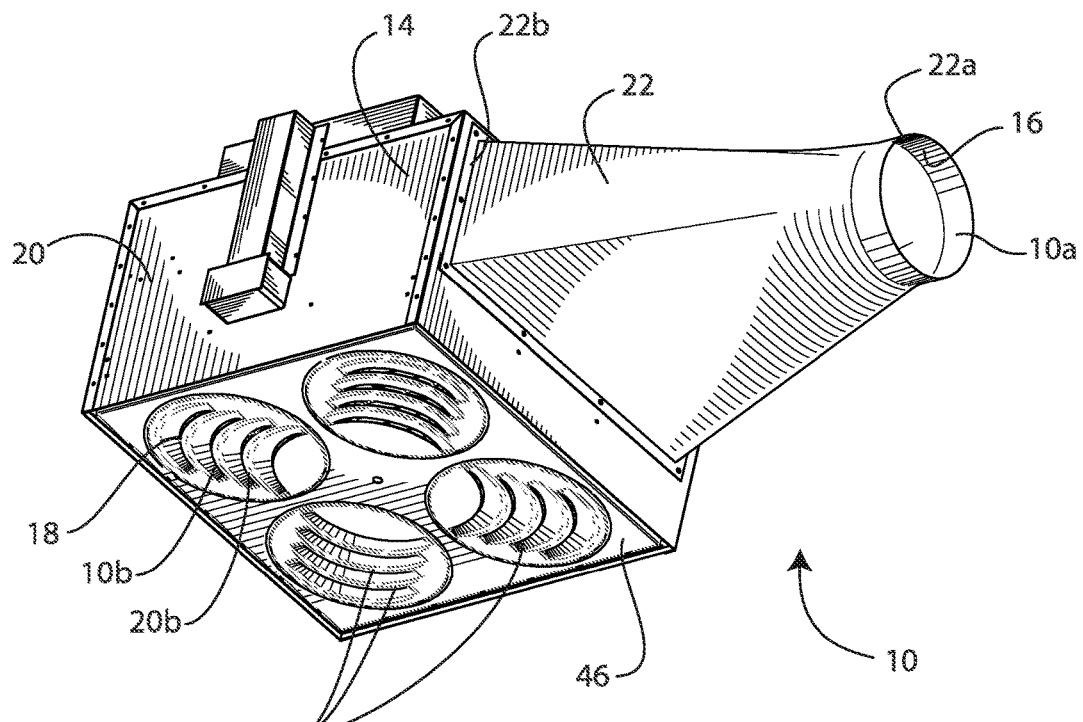
FIG. 1 is a bottom perspective view of an air purifying apparatus according to the present invention.
Figure 2:
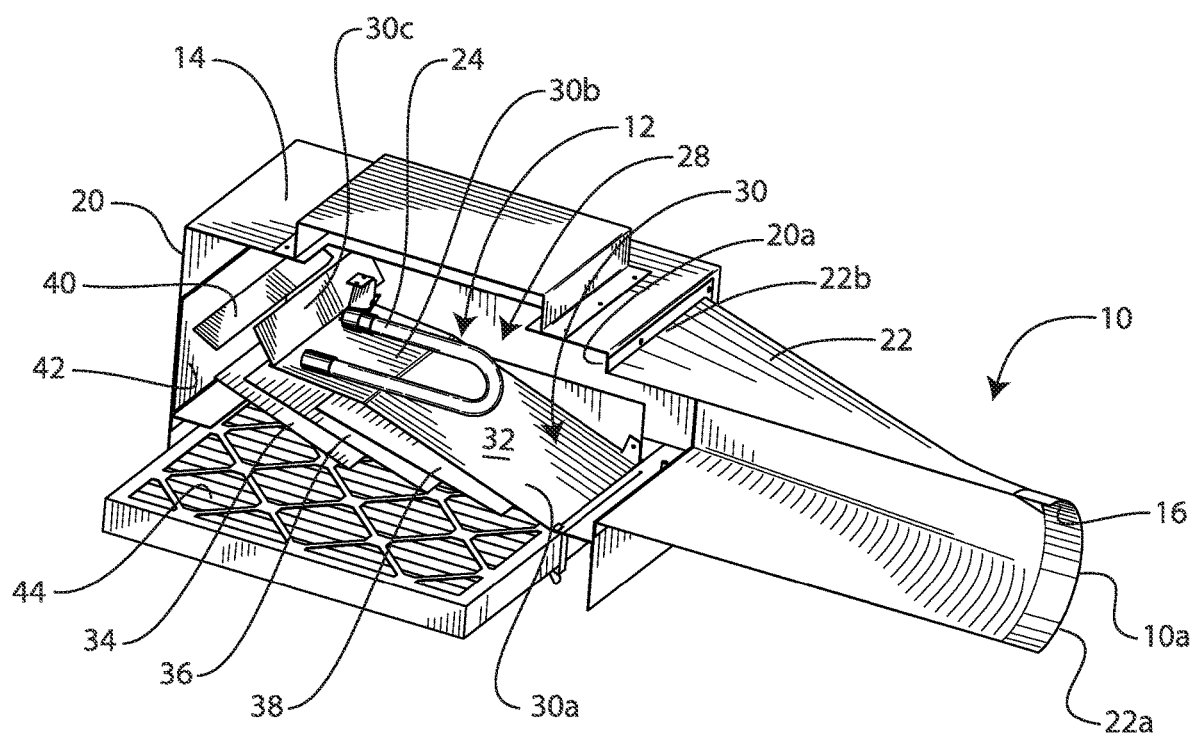
FIG. 2 is a top perspective view of the air purifying apparatus of FIG. 1, which is partly broken along a vertical plane, with the macro-particulate air filter being shown entirely nonetheless and extending beyond that vertical plane.
Figure 3:
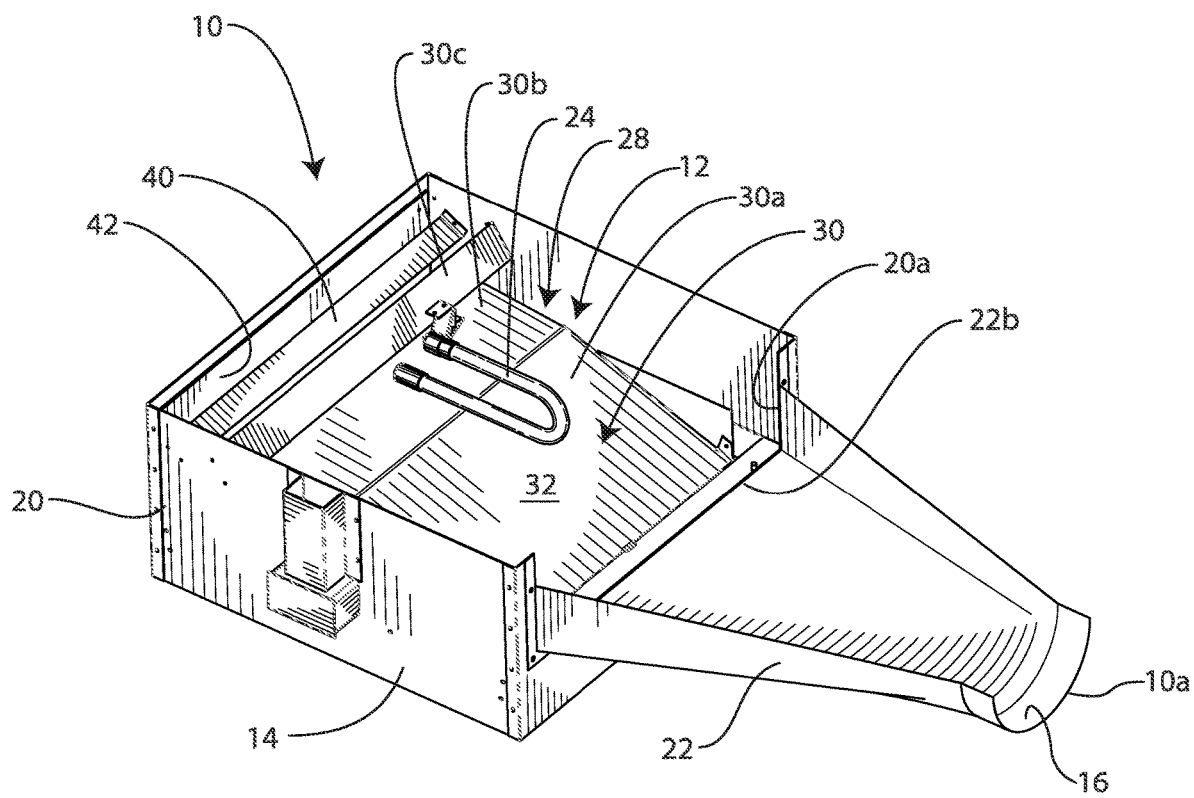
FIG. 3 is a top perspective view of the air purifying apparatus of FIG. 1, which is partly broken along a first horizontal plane in the plenum and a second horizontal plane in the diverging collar, with the UV lamp being shown nonetheless above the first horizontal plane.
Figure 4:
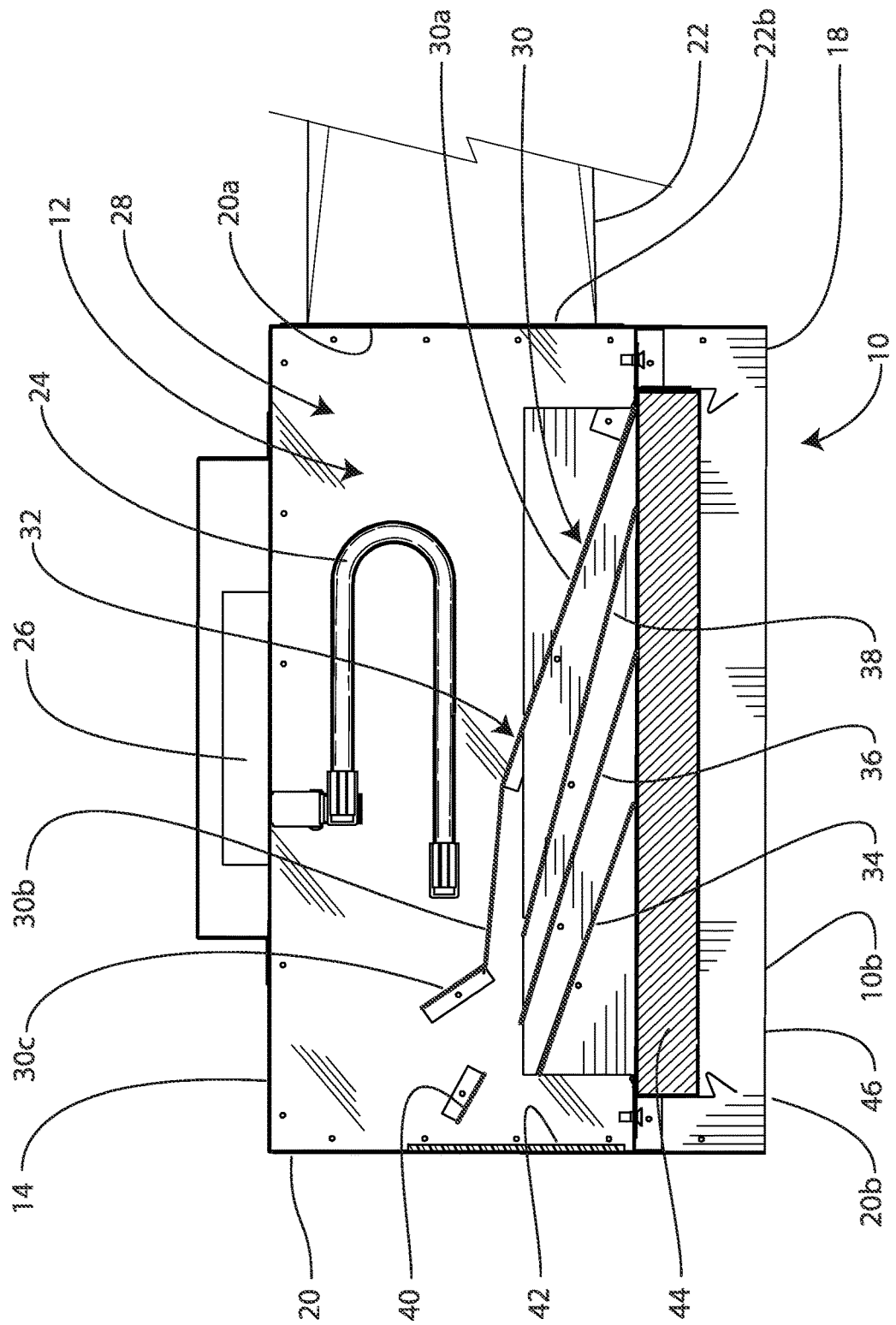
FIG. 4 is an enlarged partial cross-sectional view, partly schematic, of the air purifying apparatus of FIG. 1.

FIGS. 1-4 show an air purifying apparatus 10 for purifying air, according to the present invention. Air purifying apparatus 10 is for supplying air into a destination area (not shown) such as the room of a building, from an air source (not shown) such as a ventilation system that includes an air duct (not shown) destined to be connected to the air purifying apparatus 10 as detailed hereinafter.

Air purifying apparatus 10 comprises a purifying chamber 12 that has a peripheral wall 14. Peripheral wall 14 comprises an air inlet 16 for receiving air into purifying chamber 12 from the air source and an air outlet 18 for supplying air from purifying chamber 12 to the air destination area. The purifying chamber 12 comprises a plenum 20 to which a diverging collar 22 is connected. Peripheral wall 14 may be considered to include both the peripheral wall of the plenum 20 and of the diverging collar 22, and purifying chamber 12 may be considered to include both the inside of plenum 20 and the inside of collar 22.

Air purifying apparatus 10 further defines an air channel extending between air inlet 16 and air outlet 18 for allowing the air to flow therein from an upstream end 10a at air inlet 16 towards a downstream end 10b at air outlet 18. The diverging collar 22 itself has a first end 22a at the air inlet 16 and a second end 22b downstream of its first end 22a that connects to a first open end 20a of plenum 20 that allows air to flow from within collar 22 to within plenum 20. Collar 22 has a wider cross-sectional area at its second end 22b than at its first end, as detailed hereinafter. Plenum 20 has a second end 20b at air outlet 18.

Upstream and downstream references in the present specification, are made with respect to the air channel, i.e. the path followed by the air that flows through air purifying apparatus 10 from its upstream end 10a to its downstream end 10b.

A UV light source 24 is located within purifying chamber 12. In one embodiment, the UV light source is a generally U-shaped, including e.g. a J-shaped (where one leg is shorter than the other), UV-emitting light tube attached to peripheral wall 20. In one embodiment, the UV light emitted by light source 24 is of the "C" type, i.e. UV-C light. A non-exclusive example of a UV light source usable with the present invention is the Sanuvox T6 High Intensity Germicidal 10.5" UV "J" Lamp (model #LMPHGJ105). Other UV lamps with similar air purifying effects, including germicidal effects, may also be used, as will be obvious to someone skilled in the art. UV light source 24 includes a suitable enabling circuit 26 such as a ballast that, when plugged to an electric grid or connected to a battery (not shown), will allow light source 24 to emit UV light.

In the present specification, reference will be made to UV-absorbing and UV-reflective surfaces or materials. This means that each such reflective surface or material is considered to allow at least some significant reflection of UV light, while each such absorbing surface or material is considered to allow at least some significant absorption of UV light. Perfect reflection or absorption are not necessary, and in practice, will probably not exist. In addition to being interpreted by the person skilled in the art, the UV light "reflective" or "absorbing" qualities of surfaces or materials should also be interpreted with respect to each other, namely, UV-reflective surfaces or materials are considered to reflect more UV light per surface area than UV absorbing surfaces or materials referred to herein; and inversely, UV-absorbing surfaces or materials are considered to absorb more UV light per surface area than UV-reflective surfaces or materials referred to herein.

Air purifying apparatus 10 further comprises a main baffle plate 30 installed downstream of air inlet 16 and upstream of air outlet 18 such that the air channel will deviate in non-linear fashion about main baffle plate 30. More particularly, main baffle plate 30 is fixed within purifying chamber 12 to peripheral wall 14 within plenum 20, and extends from near plenum first end 20*a* in inclined fashion up and away into plenum 20 such that the air channel will be forced around main baffle plate 30 when flowing from plenum first end 20*a* to plenum second end 20*b*.

Main baffle plate 30 comprises at least two segments with different angulations relative to the air channel. More particularly, main baffle plate 30 comprises three segments, namely, a first segment 30*a* fixed near the plenum first end 20*a*; a second segment 30*b* attached to first segment 30*a*; and a third segment 30*c*, attached to second segment 30*b*.

An irradiation portion 28 of purifying chamber 12 is defined as that portion of purifying chamber 12 which is located in the general area above main baffle plate 30 about UV light source 24 and within collar 22, where UV light from UV light source 24 may irradiate directly.

Main baffle plate 30 comprises a UV-reflective and air-deflection surface 32 that is in register with UV light source 24 and that is tangentially oriented at least partly upstream in the air channel, i.e. it is inclined at least partly towards the direction from which the air flows, to reflect at least part of the UV light emitted by UV light source 124 upstream in the air channel; and to create a first deviation of the air flow and to decrease the cross-sectional area of the air channel downstream of irradiation portion 28.

With its different angulations, main baffle plate 30 defines a downstream segment of its reflective surface 32 (that is the surface of third segment 30*c* that faces towards irradiation portion 28) that is more tangentially oriented upstream than an upstream segment thereof (that is the surface of segment 30*a* that faces towards irradiation portion 28) and than an intermediate segment thereof (that is the surface of second segment 30*b* that faces towards irradiation portion 28). The intermediate segment of reflective surface 32 is less tangentially oriented upstream than its upstream and downstream segments. This variation in the angulation of segments 30*a*, 30*b*, 30*c* of main baffle plate 30 allows to balance a desired air flow through purifying chamber 12 and a suitable control of UV light reflection therein, as detailed hereinafter.

Reflective surface 32 of main baffle plate 30 and peripheral wall 14 are made from a UV-reflective material. For example, peripheral wall 14 and baffle plate reflective surface 32 can be made from aluminium. For ease of construction, the entire baffle plate 30 and peripheral wall 14 may be made from aluminium; or, they may be coated or covered with a UV-light reflective material on their surface that faces irradiation portion 28.

Air purifying apparatus 10 further comprises at least one secondary baffle plate, and more particularly, three secondary baffle plates 34, 36, 38 within purifying chamber 12 and located in the air channel downstream of main baffle plate reflective surface 32, and more particularly, near air outlet 18 on the opposite site of main baffle plate 30 relative to reflective surface 32. Secondary baffle plates 34, 36, 38 comprise a UV-absorbing surface, e.g. secondary baffle plates may be made from steel. Secondary baffle plates 34, 36, 38 are tangentially oriented partly upstream for blocking and absorbing at least part of the UV light emitted by UV light source 24 before it reaches air outlet 18, as detailed hereinafter.

Air purifying apparatus 10 further comprises an auxiliary baffle plate 40 within purifying chamber 12 located in the air channel between main baffle plate reflective surface 32 and secondary baffle plates 34, 36, 38. Auxiliary baffle plate 40 comprises a UV-reflective surface, e.g. auxiliary baffle plate 40 may be made form aluminium or coated on its reflective surface that faces upstream, with a UV-reflective material. Auxiliary baffle plate 40 is tangentially oriented at least partly upstream to reflect at least part of the UV light emitted by UV light source 24 back upstream in the air channel as detailed hereinafter.

Air purifying apparatus 10 also comprises a UV-absorbing panel 42 provided on peripheral wall 14 downstream of main baffle plate 30, near auxiliary baffle plate 40. UV-absorbing panel 42 is made from a UV-absorbing material, e.g. from polycarbonate.

Air purifying apparatus 10 comprises a particulate air filter 44 adjacent to, and upstream of, air outlet 18, for filtering macro-particulate air-borne particles. A diffuser panel 46 is provided at air outlet 18 with openings 48 disposed according to a desired configuration to allow air to flow out of air purifying apparatus 10 into the destination area.

In use, air purifying apparatus 10 allows air from an air source to be purified, i.e. notably from micro-organisms by means of the UV light source 24, before it is supplied to a destination area through air outlet 18. Air purifying apparatus 10 allows optimizing the air purification through a control of the reflection of the UV light within the air channel while limiting UV light emission beyond air outlet 18; and through a control of the air flow through the air channel. Both of these aspects will be detailed below.

1. UV Light Reflection is Controlled within Air Purifying Apparatus 10

Figure 5:
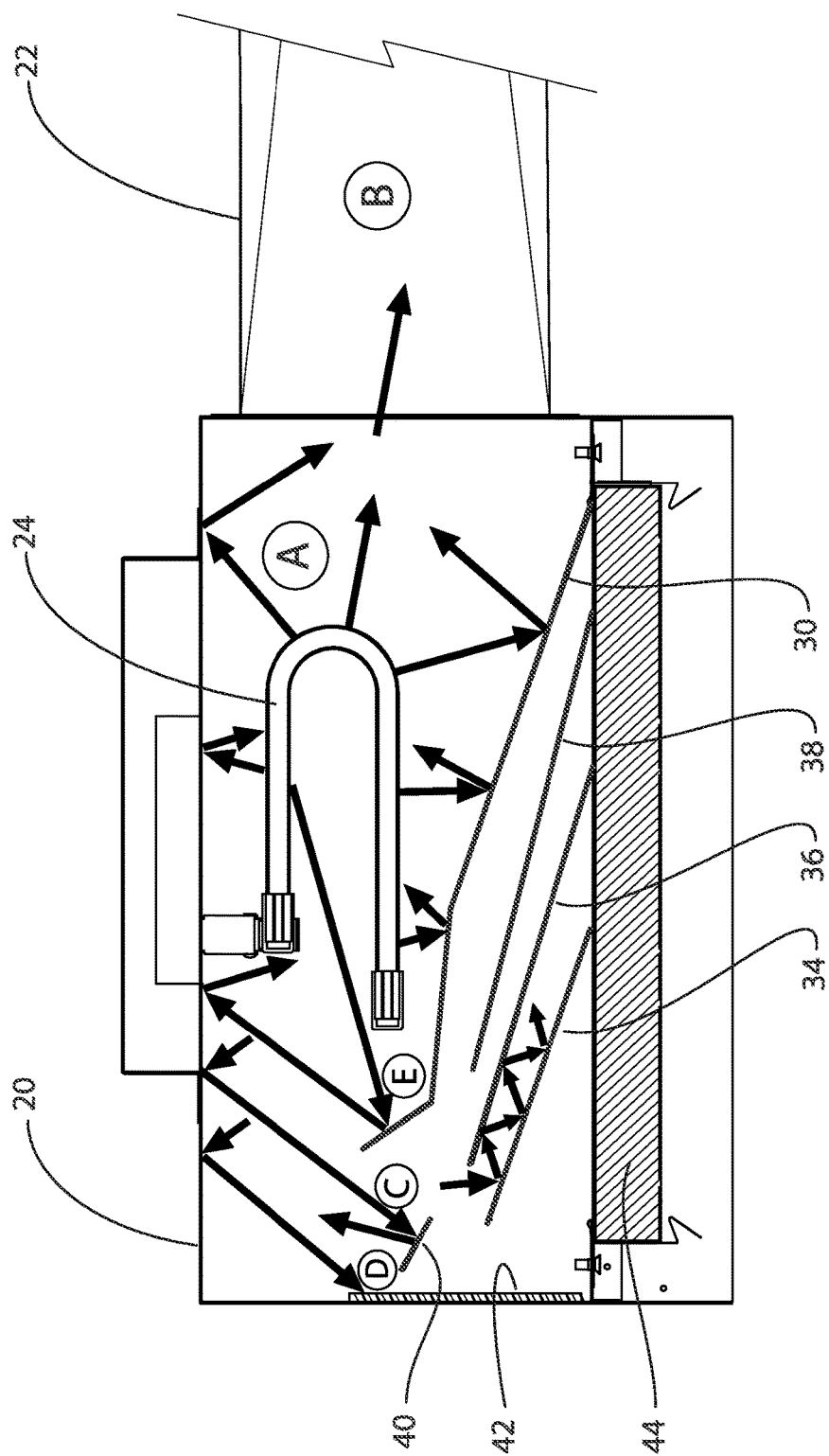
FIG. 5 is similar to FIG. 4, but it suggests with arrows the UV-light reflection against different surfaces of the apparatus.

FIG. 5 suggests how UV light reflection is controlled within air purifying apparatus 10 by symbolizing UV light with arrows.

The UV light emitted by light source 24 within irradiation portion 28 of purifying chamber 12 will directly irradiate the air within irradiation portion 28, including in plenum 20 in area A but also in collar 22 in area B. Furthermore, the UV light will reflect on reflective surface 32 of main baffle plate 30, on the peripheral wall 14 of plenum 20 and on auxiliary baffle plate 40 such that the actual exposure of the air to the light from UV light source 42 in area A will be significantly increased. The main baffle plate 30 and the auxiliary baffle plate 40, helped by the UV light absorbing panel 42, form a UV light barrier in area C that most UV light will not pass. Indeed, the disposition of the light source 24 with respect to this UV light barrier is such that most UV light will be reflected back within irradiation portion 28; while that which hits the light absorbing panel 42 will be mostly absorbed as shown at D. The angle of the third segment of baffle plate 30c, a.k.a. the downstream segment of its reflective surface, is particularly inclined to be tangentially oriented upstream and contributes to help reflect the UV light as shown at E. Also, auxiliary baffle plate 40 is positioned such that straight lines cannot be traced from UV light source 24 to air outlet 18 with less than three reflections within said purifying chamber, including at least two reflections against a light absorbing surface.

Downstream of this UV barrier, most of the light is likely to be reflected multiple times against the inclined almost parallel secondary baffle plates 34, 36, 38 to be mostly absorbed before it reaches the air filter 44—that incidentally also absorbs UV light—such that the UV light emitted beyond air outlet 18 will remain below the regulated safety standards of UV-light emission.

2. Air Flow Controlled within Air Purifying Apparatus 10.

Figure 6:
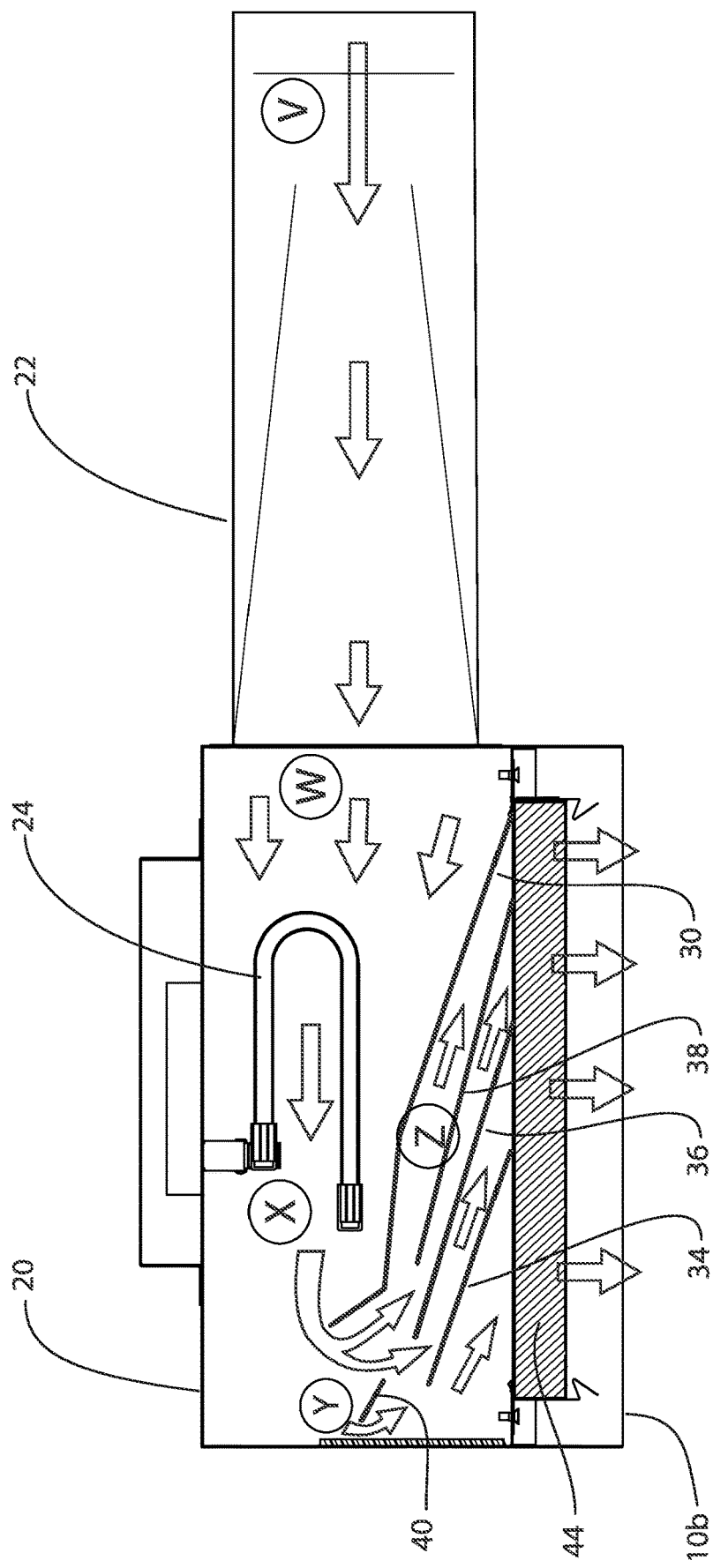
FIG. 6 is similar to FIG. 4, but it suggests with arrows the air flow speed, with the relative length of the arrows symbolically suggesting the magnitude of the air flow speed.

FIG. 6 suggests how air flow is controlled within air purifying apparatus by symbolizing air flow with arrows, where longer arrows mean greater air speed. As a reminder, the air is fed to air inlet 16 from an air source that normally includes positive air pressure, e.g. by using an air pump or a fan.

As it enters diverging collar 22 at area V, the air flow is relatively quick. Then, the increase of the cross-sectional area of the air channel in irradiation portion 28 between air inlet 16 and UV light source 24 will force the air flow speed to decrease, before gradually increasing again through area X as the cross-sectional area of the air channel decreases towards Y at the UV barrier formed at the main baffle plate third segment 30c and the auxiliary baffle plate 40. This decrease of the air flow speed at area W and, to a lesser extent, at area X, will allow a prolonged exposition of the air to the UV irradiation in irradiation portion 28 to increase the germicidal effect of the UV exposition.

Beyond area Y, air speed will unavoidably decrease upstream of the air filter, since the latter will restrict air flow somewhat.

The auxiliary baffle plate 40 is inclined such that air circulating in the air channel at area Y will not entirely flow out through air outlet 18 on either side of secondary baffle plate 34 where it would normally flow if not for auxiliary baffle plate 40. Indeed, auxiliary baffle plate 40 will instead deviate part of the air flow towards an area located on either side of secondary baffle plates 36 and 38 where it would otherwise circulate much less were it not for auxiliary baffle plate 40. This is desirable since it allows a relatively even distribution of air through air outlet 18.

In one embodiment, UV light source 24 further emits visible light that is in the humanly perceptible visible spectrum, such as blue light. By selecting light absorbing materials such as that mentioned in the present specification (steel, polycarbonate), it has been found that this allows the visible blue light to be less absorbed within purifying chamber 12 than the UV light, such that at least some of the visible blue light will emanate out through air outlet 18. This has two advantages: (a) it acts as a confirmation that the air purifying apparatus is emitting light, and since this light is emitted by the same light source as the UV light, then this means that the purifying process is working, which is relevant information for the maintenance staff. Also, (b) the visible blue light acts as a notice to anyone standing in the room that they are within an area wherein the air being supplied is purified by an apparatus 10 according to the present invention, which is comforting.

The invention claimed is:

1. An air purifying apparatus for purifying air, comprising:
a purifying chamber comprising a peripheral wall that has an air inlet for receiving air into said purifying chamber from an air source and an air outlet for supplying air from said purifying chamber to an air destination area;
a UV light source located within an irradiation portion of said purifying chamber, for emitting air purifying UV light therein;
an air channel extending between said air inlet and said air outlet for allowing an air stream to flow therein from an upstream end at said air inlet towards a downstream end at said air outlet and to be purified by the UV light between said upstream and downstream ends; and
a main baffle plate fixed within said purifying chamber downstream of said air inlet and upstream of said air outlet such that said air channel will be formed about said main baffle plate, said main baffle plate comprising a UV-reflective surface in register with said UV light source and that is tangentially oriented at least partly upstream to reflect at least part of the UV light emitted by said UV light source upstream in said air channel, wherein said main baffle plate UV-reflective surface comprises at least two segments with different tangential angulations relative to said air channel for providing UV light reflecting surfaces of different orientations, wherein said at least two segments comprise an upstream segment and a downstream segment located downstream of said upstream segment, with said downstream segment being more tangentially oriented upstream than said upstream segment,
wherein said air channel extends entirely through an area in register with said UV-reflective surface of said main baffle plate for forcing the entire air stream to flow in register with said UV-reflective surface such that the entire air stream will be purified by said UV light both by direct exposition to said UV light and indirect exposition to said UV light that is reflected by said UV-reflective surface.

2. The air purifying apparatus as defined in claim 1, further comprising at least one secondary baffle plate within said purifying chamber located in said air channel downstream of said main baffle plate UV-reflective surface, said at least one secondary baffle plate comprising a UV-absorbing surface, said at least one secondary baffle plate tangentially oriented at least partly upstream for blocking and absorbing at least part of the UV light emitted by said UV light source before it reaches said air outlet.

3. The air purifying apparatus as defined in claim 2, wherein said at least one secondary baffle plate is located on an opposite side of said main baffle plate relative to said main baffle plate UV-reflective surface.

4. The air purifying apparatus as defined in claim 3, wherein said at least one secondary baffle plate comprises three secondary baffle plates disposed adjacent to said air outlet.

5. The air purifying apparatus as defined in claim 4, further comprising an auxiliary baffle plate within said purifying chamber located in said air channel between said main baffle plate UV-reflective surface and said secondary baffle plates, said auxiliary baffle plate comprising a UV-reflective surface that is tangentially oriented at least partly upstream to reflect at least part of the UV light emitted by said UV light source upstream in said air channel, said auxiliary baffle plate positioned such that straight lines cannot be traced from said UV light source to said air outlet with less than three reflections within said purifying chamber to increase the absorption of said UV light therein.

6. The air purifying apparatus as defined in claim 5, wherein said purifying chamber peripheral wall is made of UV-reflective material.

7. The air purifying apparatus as defined in claim 6, further comprising a UV-absorbing panel provided on said peripheral wall downstream of said main baffle plate.

8. The air purifying apparatus as defined in claim 1, wherein said UV light source is a generally U-shaped UV-emitting light tube attached to said peripheral wall.

9. The air purifying apparatus as defined in claim 1, wherein said UV light source further emits visible light that is in the humanly perceptible visible spectrum, said visible light being less absorbed within said purifying chamber than said UV light such that at least some of said visible light will emanate out through said air outlet.

10. An air purifying apparatus for purifying air, comprising:
- a purifying chamber comprising a peripheral wall that has an air inlet for receiving air into said purifying chamber from an air source and an air outlet for supplying air from said purifying chamber to an air destination area;
- a UV light source located within an irradiation portion of said purifying chamber, for emitting air purifying UV light therein;
- an air channel extending between said air inlet and said air outlet for allowing the air to flow therein from an upstream end at said air inlet towards a downstream end at said air outlet and to be purified by the UV light between said upstream and downstream ends; and
- a main baffle plate fixed within said purifying chamber downstream of said air inlet and upstream of said air outlet such that said air channel will be formed about said main baffle plate, said main baffle plate comprising a UV-reflective surface in register with said UV light source and that is tangentially oriented at least partly upstream to reflect at least part of the UV light emitted by said UV light source upstream in said air channel;
- wherein said main baffle plate UV-reflective surface comprises at least two segments with different angulations relative to said air channel, said at least two segments comprising an upstream segment located at an upstream extremity of said main baffle plate UV-reflective surface and a downstream segment located at a downstream extremity of said main baffle plate reflective surface, with said downstream segment being more tangentially oriented upstream than said upstream segment.

11. The air purifying apparatus as defined in claim 10, wherein said at least two segments further comprise an intermediate segment located intermediate said upstream and downstream segments, with the intermediate segment being less tangentially oriented upstream than said upstream and downstream segments.

12. An air purifying apparatus for purifying air, comprising:
- a purifying chamber comprising a peripheral wall that has an air inlet for receiving air into said purifying chamber from an air source and an air outlet for providing air from said purifying chamber to an air destination;
- a UV light source located within an irradiation portion of said purifying chamber, for emitting air-purifying UV light therein;
- an air channel extending between said air inlet and said air outlet for allowing an air stream to flow from an upstream end at said air inlet towards a downstream end at said air outlet and to be purified by the UV light between said upstream and downstream ends; and
- a main baffle plate fixed within said purifying chamber downstream of said air inlet and upstream of said air outlet, said main baffle plate comprising an air deflection surface that is tangentially oriented at least partly upstream, said main baffle plate deflection surface creating a first deviation of said air channel, said main baffle plate further decreasing the cross-sectional area of said air channel in said irradiation portion downstream of said irradiation portion, said main baffle plate air deflection surface comprises at least two segments with different tangential angulations relative to said air channel for providing air deflection surfaces of different orientations, wherein said at least two segments comprise an upstream segment and a downstream segment located downstream of said upstream segment, with said downstream segment being more tangentially oriented upstream than said upstream segment;
- wherein the air channel has a wider cross-sectional area at said irradiation portion of said purifying chamber than at said air inlet, for decreasing the speed of the air flowing through said air channel from said air inlet into said irradiation portion of said purifying chamber and for increasing the time during which air particles will be exposed to the UV light source within said irradiation portion of said purifying chamber; and wherein said air channel extends entirely through an area in register with said air deflection surface of said main baffle plate for forcing the entire air stream to flow in register with said air deflection surface.

13. The air purifying apparatus as defined in claim 12, wherein said purifying chamber comprises a plenum and a diverging collar upstream of said plenum, said diverging collar having a first end at said upstream end of said purifying chamber and a second end downstream of said first end, said diverging collar having a wider cross-sectional area at said second end than at said first end.

14. The air purifying apparatus as defined in claim 12, further comprising at least one secondary baffle plate within said purifying chamber and located in said air channel downstream of said main baffle plate, said at least one secondary baffle plate being tangentially oriented partly downstream and creating a second deviation of said air channel.

15. The air purifying apparatus as defined in claim 14, wherein said at least one secondary baffle plate is located on an opposite side of said main baffle plate relative to said irradiation portion.

16. The air purifying apparatus as defined in claim 15, wherein said at least one secondary baffle plate comprises three secondary baffle plates disposed adjacent to said air outlet.

17. The air purifying apparatus as defined in claim 16, further comprising an auxiliary baffle plate within said purifying chamber located in said air channel between said main baffle plate deflection surface and said secondary baffle plates, said auxiliary baffle plate being inclined at least partly upstream such that a portion of the air circulating in said air channel will be at least partly deviated toward an area located between some secondary baffle plates where it would otherwise circulate at a lesser debit rate.

18. The air purifying apparatus as defined in claim 17, wherein said air outlet is provided with a particulate air filter for filtering macro-particulate air-borne particles being conveyed through said air outlet, said particulate air filter further creating an air debit rate restriction upstream of said air outlet.

19. An air purifying apparatus for purifying air, comprising:
- a purifying chamber comprising a peripheral wall that has an air inlet for receiving air into said purifying chamber from an air source and an air outlet for providing air from said purifying chamber to an air destination;
- a UV light source located within an irradiation portion of said purifying chamber, for emitting air-purifying UV light therein;
- an air channel extending between said air inlet and said air outlet for allowing the air to flow from an upstream end at said air inlet towards a downstream end at said air outlet and to be purified by the UV light between said upstream and downstream ends; and
- a main baffle plate fixed within said purifying chamber downstream of said air inlet and upstream of said air outlet, said main baffle plate comprising an air deflection surface that is tangentially oriented at least partly upstream, said main baffle plate deflection surface creating a first deviation of said air channel, said main baffle plate further decreasing the cross-sectional area of said air channel in said irradiation portion downstream of said irradiation portion wherein the air channel has a wider cross-sectional area at said irradiation portion of said purifying chamber than at said air inlet, for decreasing the speed of the air flowing through said air channel from said air inlet into said irradiation portion of said purifying chamber and for increasing the time during which air particles will be exposed to the UV light source within said irradiation portion of said purifying chamber; and wherein said main baffle plate deflection surface comprises at least two segments with different angulations relative to said upstream end, said at least two segments comprising an upstream segment located at an upstream extremity of said main baffle plate and a downstream segment located at a downstream extremity of said main baffle plate, with said downstream segment being more tangentially oriented upstream than said upstream segment.

20. The air purifying apparatus as defined in claim 19, wherein said at least two segments further comprise an intermediate segment located intermediate said upstream and downstream segments, with the intermediate segment being less tangentially oriented upstream than said upstream and downstream segments.

* * * * *